United States Patent [19]
Reinhardt et al.

[11] Patent Number: 4,901,571
[45] Date of Patent: Feb. 20, 1990

[54] ACCELERATION PICKUP

[75] Inventors: Gunter Reinhardt, Ludwigsbug-Ossweil; Kasimir Stromski, Filderstadt, both of Fed. Rep. of Germany

[73] Assignee: Robert Bosch GmbH, Stuttgart, Fed. Rep. of Germany

[21] Appl. No.: 301,824

[22] Filed: Jan. 25, 1989

[30] Foreign Application Priority Data

Feb. 11, 1988 [DE] Fed. Rep. of Germany ....... 3804220

[51] Int. Cl.[4] ............................................. G01P 15/11
[52] U.S. Cl. .................................... 73/517 R; 73/522; 73/DIG. 3
[58] Field of Search ............... 73/517 R, 522, DIG. 3, 73/654; 200/61.45 M

[56] References Cited

U.S. PATENT DOCUMENTS

| | | | |
|---|---|---|---|
| 2,979,959 | 4/1961 | Clurman | 73/654 |
| 3,748,415 | 7/1973 | Suzuki | 200/61.45 M |
| 4,311,051 | 1/1982 | Eon et al. | 73/517 R |
| 4,656,750 | 4/1987 | Pitt et al. | 73/517 R |

*Primary Examiner*—Tom Noland
*Attorney, Agent, or Firm*—Michael J. Striker

[57] ABSTRACT

An acceleration pickup has a housing of a diamagnetic or paramagnetic material enclosing a ferromagnetic ball acting as seismic mass. The ball is held in a starting position on the bottom of the housing by means of a magnetic field generated by a permanent magnet or an electromagnet. By means of four induction sensitive sensors such as for example Hall effect sensors arranged opposite each other on the circumference of the housing, the momentary value and direction of acceleration component acting on the pickup is determined. The acceleration pickup is simple in construction and cost effective in manufacture and is easily adjustable to different applications.

9 Claims, 2 Drawing Sheets

ACCELERATION PICKUP

BACKGROUND OF THE INVENTION

The present invention relates to an acceleration pickup for use in antislip regulation or similar control systems in a motor vehicle.

In conventional pickups of this kind acting in two dimensions a spring-mass system is employed. From deviation of the mass under the influence of acceleration against the biasing force of the spring the momentary acceleration in two directions can be determined. In doing so, a Hall-effect sensor is excited by means of a permanent magnet whereby a precise mechanical adjustment of zero position must be guaranteed.

In acceleration pickups acting in a single direction only it has been known to fix the seismic mass by means of a magnet.

SUMMARY OF THE INVENTION

An object of the present invention is to provide an acceleration sensor acting in two dimensions whereby the mechanical zero position or starting position of the seismic mass (a ball for example) can be reliably adjusted by simple means.

Another object of this invention is to provide such an improved acceleration pickup in which the magnetic attraction force holding the ball in its starting position is independent of direction.

Another object of this invention is to reliably detect horizontal acceleration components from all directions in a horizontal plane of a motor vehicle.

Still another object of this invention is to reduce frictional forces acting on the seismic mass (ball).

An additional object of this invention is to make the acceleration pickup unsensitive against shocks resulting for example during the drive over potholes or other unevenness of the driveway.

A further object of this invention is to provide an improved adjustability of the holding force of the seismic mass in its starting position.

Furthermore, an object of the invention is to provide an acceleration pickup which is almost independent of aging, temperature and power supply interferences.

In keeping with these objects and with which will become apparent hereafter, one feature of this invention resides in the provision of a housing of a paramagnetic or diamagnetic material in which a ferromagnetic body is movably arranged, the body being held in its starting position by means of a magnetic field. The housing is fixedly secured in a motor vehicle. Upon sudden vehicle acceleration, i.e. as a result of a traffic accident, the housing will move with the vehicle in the acceleration direction. Because of its inertia the body is freely movable relative to the housing in opposite direction to a horizontal acceleration component acting on the pickup. As a result the body deforms the magnetic field such that induction sensitive sensors arranged around the plane of movement of the body detect the changes of the magnetic field and thus determine momentary values and directions of the acceleration component.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 3:
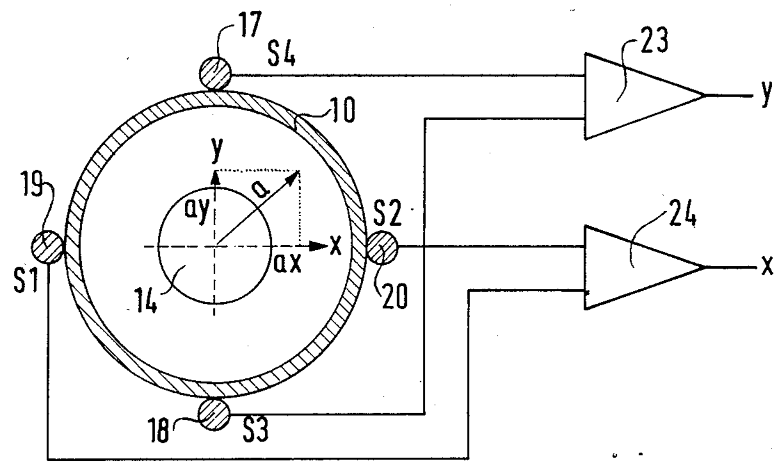
FIG. 3 is a sectional plan view of the pickup of FIG. 1 with a sensor signal evaluating circuit.
Figure 4:
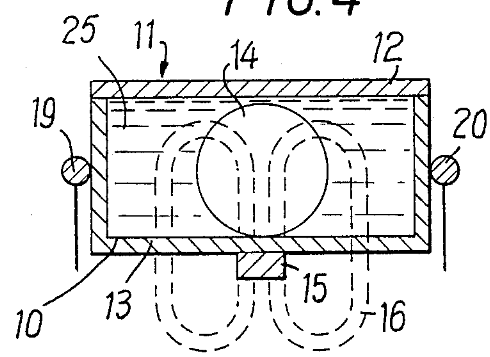
FIG. 4 is a longitudinal sectional view of an acceleration pickup with the housing thereof filled with a highly viscous dampening fluid.
Figure 5:
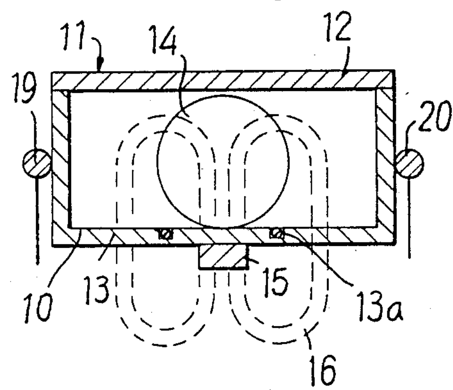
FIG. 5 is a view similar to that of FIG. 1 but with a coil ring providing dampening eddy current.

In the figures, there is illustrated an acceleration pickup 11 assembled of a cup-shaped housing 10 closed by a plate 12. The housing 10 and the plate 12 are of a diamagnetic or paramagnetic material. In the center of the bottom 13 of the housing a seismic mass in the form of a ferromagnetic ball 14 is normally held in a fixed starting position by a permanent magnet 15. The magnetic field 16 of the permanent magnet 15 polarizes the ferromagnetic ball 14 and holds the same in the center starting position. The diameter of the ball 14 is slightly less than the height of the housing 10. As is shown in FIG. 3, four induction sensitive sensors 17, 18, 19 and 20 are fixedly arranged at the outer surface of the jacket of the housing 10 and the sensors are spaced apart by an angle of 90° . Each pair of diametrically opposed sensors 17, 18, and 19, 20 is connected to a differential input circuit of an assigned operational amplifier 23 or 24 where the signals from respective sensor pairs are subtracted. In a modification, the sensors 17 through 20 can be connected in a Wheatstone bridge circuit.

Figure 1:
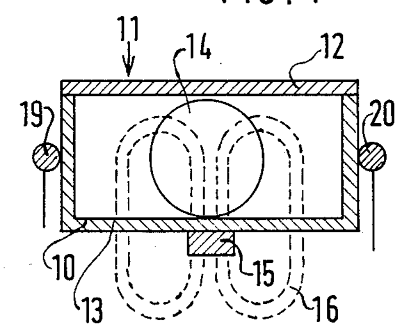
FIG. 1 is a longitudinal side section of an acceleration pickup in its starting position.
Figure 2:
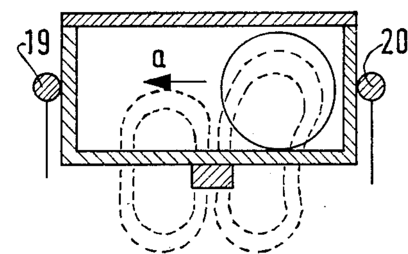
FIG. 2 is a view similar to FIG. 1 but showing the acceleration pickup in an activated position.

Referring to FIG. 2, if an acceleration component a acts on the pickup 11 in the direction indicated by arrow extending parallel to the plan of the bottom 13 then due to inertia of seismic mass of the ball 14 the relative position of the ball and the housing is changed and position of the ball is moved in counterdirection toward a housing wall. At the same time the magnetic field 16 is deformed in the direction of the relative movement of the ball 14 as seen from FIG. 2. This deformation causes a change in the distribution of the magnetic field 16 in the plane which is delimited by the sensors 17 through 20.

It will seen from FIG. 3 that any arbitrary direction of acceleration can be detected inasmuch as the vector a of the acceleration component can be defined by corresponding coordinates $a_x$ and $a_y$. In this example, the x-axis is the connection line of sensors 19, 20 and the y-axis is the connection line of sensors 17, 18. The coordinates $a_x$ and $a_y$ of the acceleration vector a are determined by voltage of frequency of signals detected at respective sensors. Inasmuch as the sensor pairs 17, 18 and 19, 20 are connected to a differential input circuit of operational amplifiers, it is possible to determine not only the value but also the direction of the momentary acceleration vector a. For example if the relative movement of ball 14 is toward the sensor 20 (FIG. 2) then the signal $S_2$ at sensor 20 is increased by a certain amount whereas the signal $S_1$ at the sensor 19 is diminished by the same amount. When the signals $S_1$ and $S_2$ of the two sensors 19, 20 are subtracted in the operational amplifier 24, the difference of the two signals determines the coordinate value $a_x$ of the acceleration component in the direction of the x-axis. Similarly, the coordinate $a_y$ is determined from the signals of sensors 17, 18 and from the ratio of the $a_x$ and $a_y$ coordinates the direction of the acceleration component can be determined. Through the differential input circuit for the signals from the sensors interferences caused by aging, temperature and operational voltage variations can be eliminated. By means of the acceleration pickup of this invention both analog as well as digital signals can be processed with a high degree of integration suitable for a microcomputer technology. For example, if the housing is made of ceramic or of a monolithic crystal then both mechanical as well as electronic components can be integrated into a single structural module.

If instead of the permanent magnet 15 an electromagnet 16 is used then the magnetic field 16 is readily adjustable to a desired level of received signals. By means of an electromagnet the density of the magnetic field 16 can be adjusted at any time such that a predetermined measuring range of the acceleration pickup is easily set. Alternatively, the measuring range of the acceleration pickup can be adjusted by changing the seismic mass or the permeability or magnetic inductivity of the material of the ball.

The sensors 17 through 20 can be of any conventional type of inductive operating sensors known from prior art. As particularly advantageous sensors however are Hall-effect sensors.

As known, when the ball 14 is subject to a jarring movement during the drive of the vehicle or due to free vibrations after deflection, then the mass of the ball may be brought into the so-called natural vibrational mode which may interfere with the measurement. In order to damp this natural oscillation, the housing 10 is filled with a liquid 25 of a high viscosity which damps the natural vibrations of the ball 14. Alternatively, the natural vibrations of the ball can be damped by eddy currents. For this purpose, a coil 13*a*, is arranged in the bottom 13 of the housing 10 in the area of the starting position of the ball. The coil is supplied with a high frequency alternating current to induce the damping eddy currents.

The acceleration pickup of this invention is particularly suitable in antiblocking systems or in antislip systems of a motor vehicle. In both systems it is necessary that the detection of the momentary acceleration component be in two directions. In addition, it is required that the pickup be insensitive to vertical shocks.

While the invention has been illustrated and described as embodied in a specific example of the acceleration pickup, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims:

1. A two-dimensional acceleration pickup for use in a control system in a motor vehicle, comprising a housing; a ferromagnetic body located in said housing and having a predetermined starting position; means for generating a magnetic field for holding said ferromagnetic body in the predetermined starting position thereof, said ferromagnetic body being freely displaceable in any direction in a horizontal plane in said housing from the predetermined starting position thereof upon a horizontal acceleration component acting on said pickup deforming the magnetic field that holds said ferromagnetic body in the predetermined starting position thereof; and at least three induction sensors for detecting a deformation of the magnetic field caused by displacement of said ferromagnetic body from the predetermined starting position thereof to thereby determine a momentary value and a direction of the horizontal acceleration component.

2. A two-dimensional acceleration pickup according to claim 1 wherein said electromagnetic body is displaceable, because of its inertia, in a direction opposite to the direction of the horizontal acceleration component.

3. A two-dimensional acceleration pickup according to claim 2, wherein said magnetic field generating means comprises an electromagnet which is used for determining a predetermined measuring range of said two-dimensional acceleration pickup.

4. A two-dimensional acceleration pickup according to claim 2, further comprising a fourth induction sensor, said four induction sensors being arranged in two pairs of diametrically opposite sensors with each pair of induction sensors being connected to a differential circuit, signals from the induction sensors of each pair being communicated to a respective substruction circuit.

5. A two-dimensional acceleration pickup according to claim 2, wherein said ferromagnetic body is formed of a ferrite material.

6. A two-dimensional acceleration pickup according to claim 2, wherein said housing is filled with a highly viscous liquid to damp natural vibration of said ferromagnetic body.

7. A two-dimensional acceleration pickup according to claim 2, further comprising means for damping natural vibrations of said ferromagnetic body with eddy currents.

8. A two-dimensional acceleration pickup according to claim 2, wherein all mechanical and electronic components thereof are integrated in a single structural unit.

9. A two-dimensional acceleration pickup according to claim 2, wherein a measuring range of said two-dimensional accelerational pickup is determined by the permeability of said ferromagnetic body.

* * * * *